(No Model.) 5 Sheets—Sheet 3.
H. FRASCH.
PROCESS OF AND APPARATUS FOR THE MANUFACTURE OF SODA BY AMMONIA.
No. 361,622. Patented Apr. 19, 1887.
FIG. III.
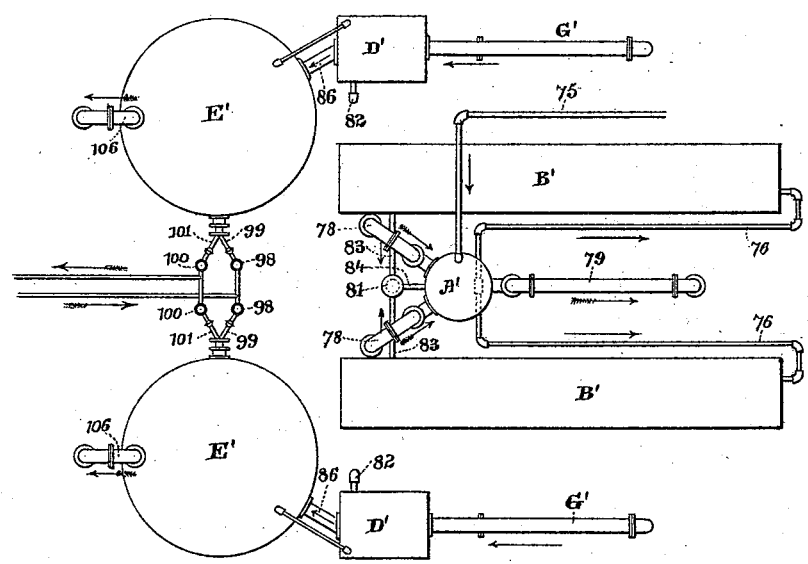

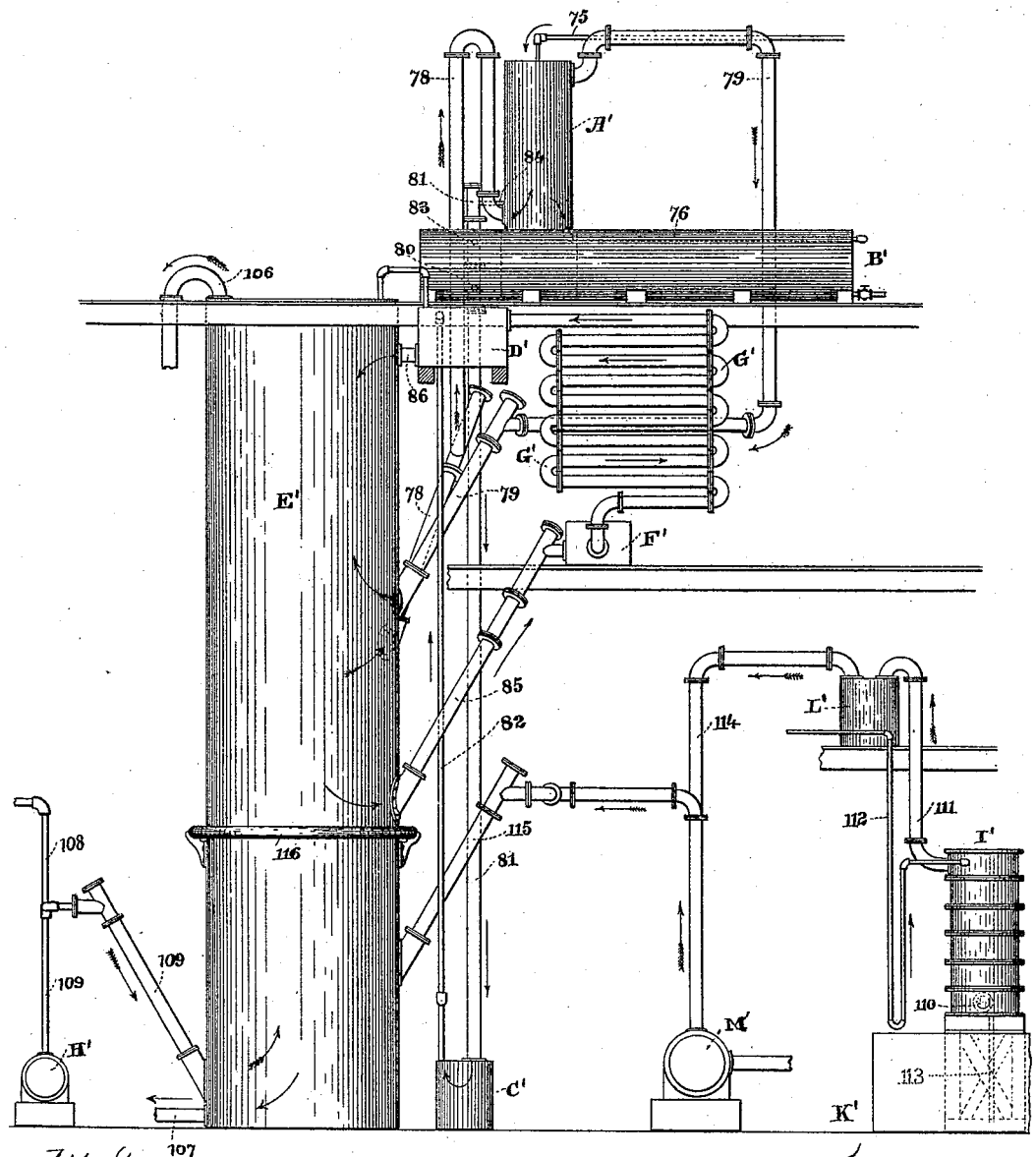

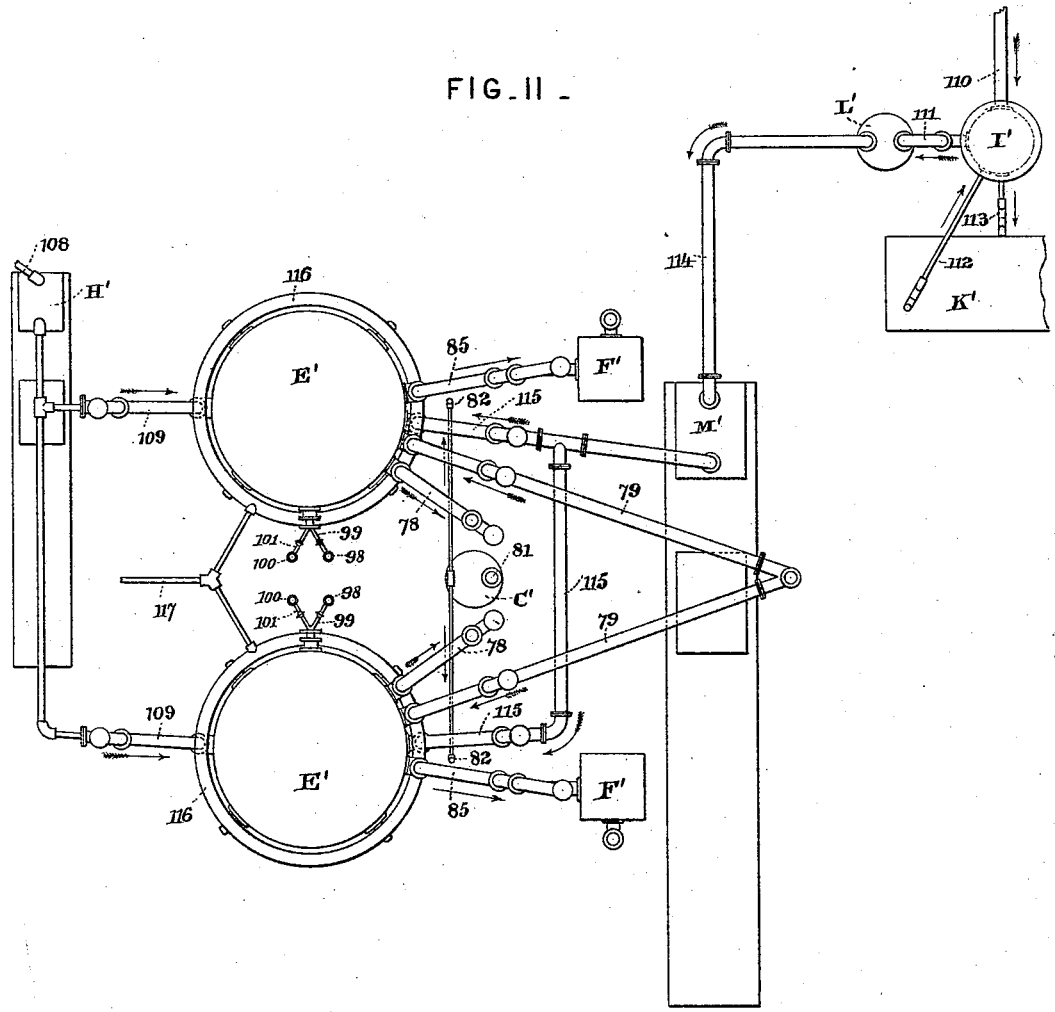

(No Model.) 5 Sheets—Sheet 4.
H. FRASCH.
PROCESS OF AND APPARATUS FOR THE MANUFACTURE OF SODA BY AMMONIA.
No. 361,622. Patented Apr. 19, 1887.
FIG. IV.
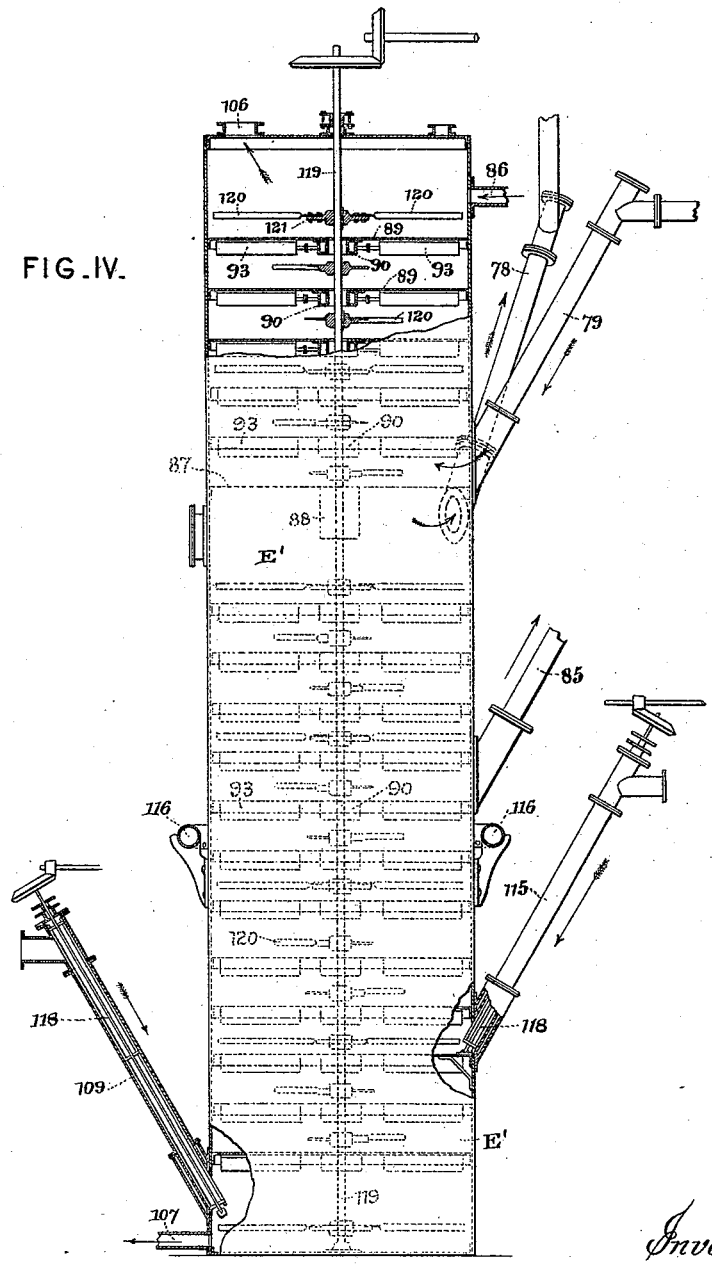

(No Model.)  5 Sheets—Sheet 5.
H. FRASCH.
PROCESS OF AND APPARATUS FOR THE MANUFACTURE OF SODA BY AMMONIA.
No. 361,622.  Patented Apr. 19, 1887.
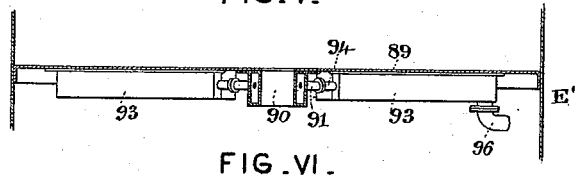
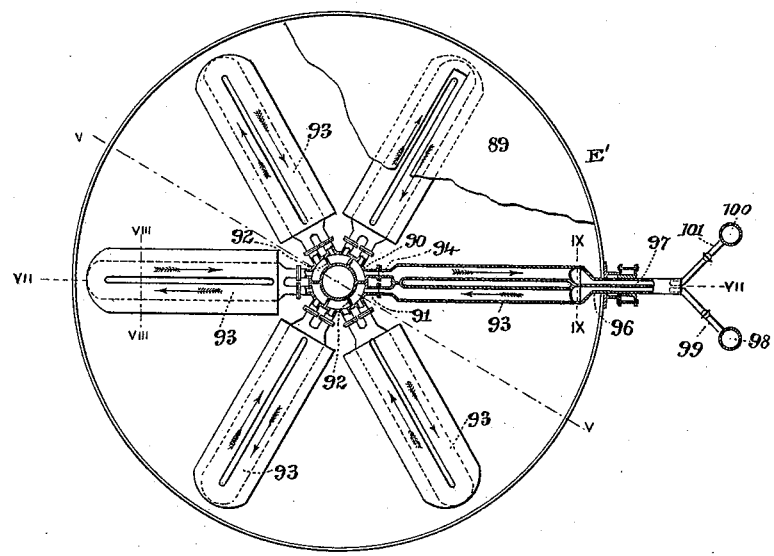
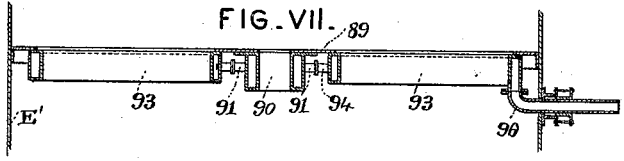
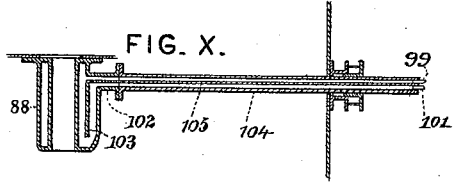
Attest:
Geo. T. Smallwood.
E. C. Wurdeman.
Inventor:
Herman Frasch
By Chas. J. Hedrick
attys.

UNITED STATES PATENT OFFICE.

HERMAN FRASCH, OF LONDON, ONTARIO, CANADA.

PROCESS OF AND APPARATUS FOR THE MANUFACTURE OF SODA BY AMMONIA.

SPECIFICATION forming part of Letters Patent No. 361,622, dated April 19, 1887.

Application filed May 5, 1886. Serial No. 201,166. (No model.)

*To all whom it may concern:*

Be it known that I, HERMAN FRASCH, a citizen of the United States, residing at London, in the Province of Ontario, Canada, have invented certain new and useful Improvements in the Manufacture of Soda by the Ammonia Process, of which the following specification is a full, clear, and exact description.

This invention relates to the manufacture of soda (sodium carbonate) by decomposing common salt (sodium chloride) in solution, with ammonia and carbonic acid, separating the sodium bicarbonate thus produced from the liquid, and roasting it to form the monocarbonate of sodium.

It has particular reference to the operation in which the conversion of the common salt into bicarbonate of sodium is effected, but includes also a preliminary carbonation of the ammoniated brine and a purification of the carbonic acid employed.

It consists, mainly, in the following improvements:

First. The soda (sodium carbonate) made by the ammonia process is apt to be impregnated more or less with carbonaceous matter of a sooty or tarry nature, which impairs its value. This contamination is due in part, if not wholly, to impurities in the carbonic acid, a part of which usually is derived from lime-kilns. To obviate the difficulty on this account the limekiln-gases are purified on their way to the carbonator or decomposing apparatus by subjecting them to the action of an alkaline solution, preferably of ammonia or ammonium carbonate, although a similar compound of sodium or potassium will answer. Impurities not removed by water are separated by this solution. Preferably the limekiln-gases are treated with the ammonium-chloride solution from which the bicarbonate of sodium has been separated, and which contains more or less ammonia or ammonium carbonate. This liquid is afterward distilled with milk of lime for the recovery of the ammonia, and the separated impurities pass off with the waste calcium-chloride solution from the still. Any suitable scrubber or apparatus for bringing liquids and gases into contact with each other may be employed; but preference is given to a system of alternating and overlapping rings and disks supported in a column.

Second. The carbonation of ammoniated brine takes place in two stages: first, the carbonic acid unites with the ammonia to form ammonium carbonate, and, second, an extra equivalent of carbonic acid is taken up, and the double decomposition of the sodium chloride and ammonium carbonate or bicarbonate takes place with precipitation of sodium bicarbonate and the formation of ammonium chloride which enters into the solution. Heat is evolved in both stages, but to the greater extent in the first stage. According to the present improvement the carbonation is divided between two apparatuses, in the first of which the monocarbonation of the ammonia may take place, the liquid being brought as a spray or shower into contact with the carbonic-acid gas, while the precipitation of the sodium bicarbonate is mainly or wholly confined to the second apparatus, in which the carbonic-acid gas bubbles up through the liquid. Further, the preliminary carbonation of the ammoniated brine is effected by the carbonic acid on its way through the precipitating apparatus, the gases being withdrawn from the said apparatus and then returned to it again after passing through the preparatory apparatus, the precipitating apparatus being so constructed that the withdrawal and return of the gas does not interfere with the passage of the liquid. By using a preparatory apparatus for bringing the gas into contact with the ammoniated brine in the form of spray, but little pressure is required to force it through said apparatus.

Third. It is desirable to effect the decomposition in such a way that the bicarbonate of sodium is precipitated in coarse crystals, in order that they may be the more readily separated by filtration. Practically it may be said that elevation of the temperature at which the decomposition takes place induces the precipitation of coarse crystals and lowering of temperature facilitates the reaction. At a sufficiently-high temperature ammonia and the carbonic acid pass off without decomposing the sodium chloride. It is found (and this is believed to be a new discovery) that the presence of ammonium chloride in the solution or the admixture of an ammonium-chloride solution with the ammoniated brine enables a coarse precipitate to be attained at a temperature lower than heretofore, and therefore more favorable to the reaction. The solution of ammonium chloride produced in the process is most conveniently employed, and its use by returning the same to be mixed with the ammoniated brine does not increase the quality of liquid to be distilled. Evidently it may be employed before or after the decomposed brine is filtered to separate the precipitated bicarbonate of sodium. Practically the desired effect is produced in the best manner by pumping back into the upper part of the carbonator or precipitating apparatus liquid which has passed through more or less of said apparatus and had the sodium chloride wholly or partly decomposed. This return of brine, besides effecting the precipitation of coarser crystals, has the further advantage that the liquid is oftener acted upon by the carbonic acid. The least force, also, is required to pump the liquor back, because the weight of the column in the return-conduit is partly balanced by the liquid in the precipitating apparatus.

Fourth. In the decomposing or precipitating apparatus it is desirable to have the rising carbonic acid pass through small openings in partitions by which the apparatus is divided, so that it may be brought into more intimate contact with the ammoniated brine. These openings are liable to become clogged by incrustation. To obviate difficulty on this account, means are provided for heating the walls of these openings. Heat thus applied causes the crust to be removed without heating the entire body of liquid in the apparatus. The same or similar means can be used for cooling the brine and carbonic acid, a cooling being substituted for a heating fluid. Practically the openings are made in hollow castings attached to or forming part of the partitions and adapted to receive a current of steam or cold water or other fluid. The inlet-pipes for the carbonic acid and other passages may similarly be provided with jackets for the same purpose.

Fifth. The carbonator, consisting of an upright column divided by perforated partitions, is combined with an upright shaft and stirrers thereon to keep the bicarbonate of sodium from settling, and also more thoroughly to mix together the ammoniated brine and the carbonic acid, the rotation causing the gas to rise in an oblique direction.

Sixth. To effect the carbonation or decomposition in the best manner, the compartments of the carbonator or precipitating apparatus are constructed to have a vapor or gas space at the top of each. These spaces increase the surface contact between the brine and the carbonic acid, which contact is found very beneficial to the reaction desired; and they also cause a mixture of the different bodies of gas arriving at different times, some of which are richer in carbonic acid than others, so that the escaping gas has the average richness in carbonic acid.

Seventh. The reaction between the sodium chloride, ammonium carbonate, and carbonic acid is most energetic in the lower part of the carbonator or precipitating apparatus, where the gases there introduced contain only a small percentage of inert gases. In the upper part the reaction is less energetic, because the percentage of inert gases is greater, a large proportion of the carbonic acid having been removed by combination with the sodium of the sodium chloride. It is therefore more important to cool the lower part of the carbonator or precipitating apparatus in order to prevent the reaction carrying the temperature so high as injuriously to affect the decomposition.

Heretofore water to cool the carbonator has been applied to top of the latter, and by the time it reached the lower parts thereof it became too warm to reduce the temperature properly. According to present improvement, a perforated pipe or sprinkler is applied to the lower part of the carbonator or precipitating apparatus, so as to supply fresh cold water to that part; or other convenient means are used with the same object.

The invention further comprises certain special constructions, combinations, and arrangement of parts, as hereinafter explained.

The following is a description of the manner in which the principle of the invention is or may be applied, reference being had to the accompanying drawings, which form a part of this specification.

Figure I is an elevation of an apparatus constructed in accordance with the invention, and Figs. II and III plan views at different floors, the stirrers, being for simplicity of illustration, omitted; Fig. IV, an elevation, partly in vertical section, of the decomposing or precipitating apparatus; and Figs. V to X, detail views of that apparatus, Figs. V, VII, VIII, and IX being sections on lines V, VII, VIII, and IX of Fig. VI, respectively.

The ammoniated brine enters the column A', for preliminary carbonation, by the pipe 75, and escapes by one of the pipes 76 into one of the settling-tanks B'. The column A', Figs. I and III, is of any ordinary or suitable construction for bringing liquid into contact with gas in the form of a spray or shower, but preferably has its interior divided by a series of trays or pans so arranged that gases rising through the column pursue a zigzag course, and is provided with stirrers for preventing settling in said trays, the same as the main still column shown in Fig. V of my application of even date herewith, No. 201,165, for preparation of the ammoniated brine. It may be provided with cooling means of any ordinary or suitable description, such as a cold-water jacket or a sprinkler for throwing water on the outside. The carbonic acid is admitted by the pipe 78 and carried off by the pipe 79.

In the tank B', Figs. I and III, the carbonate of iron and other impurities settle, and the brine therefrom, running out by the branch pipe 80, flows down the pipe 81 into the receiver C', Figs. I and II, and thence by the pipe 82 into one of the tanks D', Figs. I and III. The upper part of each of the settling-tanks B' is in communication with the pipe 81 by the branch pipe 83, and there is also a branch pipe, 84, communicating with column A' a little above the bottom. The ammoniacal vapors given off from the liquid in the settling-tanks and in the pipe 81 pass by this branch 84 back into the column A', and are taken up by the current of carbonic acid and either reabsorbed by the liquid or carried with the carbonic acid into the decomposing or precipitating apparatus E', as hereinafter described.

In the mixing-tank D' the brine from column A'—consisting, principally, of a solution of common salt and ammonium carbonate—is mixed with a stream of brine which has been further acted upon by carbonic acid and contains a considerable proportion of ammonium chloride in solution, and may contain more or less sodium bicarbonate in suspension. This decomposed or partly-decomposed brine is supplied from the lower part of the precipitating apparatus by means of a pump, F'. It is conducted from this apparatus by the pipe 85, and is circulated through a cooling-coil, G', over which a flow of cold water is maintained, and is delivered into the upper part of the mixing-tank. From the tank D' the mixed brine flows through the pipe 86 into the upper part of the precipitating apparatus E'.

Two apparatuses E' are shown; but it is not essential that there should be more than one. Either part can be used without the other, or both may be used together. Each apparatus or column is divided by a horizontal partition, 87, Fig. IV, which is imperforate except at the center, where it is provided with a collar, 88, Figs. IV and X, and the two chambers on either side are divided into compartments by a series of horizontal perforated partitions, which are or may be all alike. They each consist of a metal plate, a central casting, and a number of radial castings. The metal plates 89 are each provided with slots equal in number to the radial castings. The central castings are hollow, and have each the general form of a collar, 90, provided with tubules 91 on the periphery.

There is a pair of tubules for each radial casting, (six pairs are shown,) and the hollow space in the central casting, with which they communicate, is divided by partitions 92, placed between the tubules of each pair, so that steam or other fluid from a radial casting, entering a compartment of the central casting by one tubule, will escape by the nearer tubule of the adjacent pair into the adjacent radial casting.

Each radial casting has in the middle portion, 93, a slot whose walls diverge toward the bottom, so that it is there of greatest width. (See Fig. VIII.) On each side of the slot there is a passage for steam or other fluid, which passage is continued through the tubule 94 at the inner end of the casting. These passages communicate with each other at the outer end of the radial castings, except in one casting for each partition. This casting has a tubule, 95, Fig. IX, through which the passages are continued separately.

The tubules 94 on the radial castings are bolted to the tubules 91 on the central casting, and both kinds of castings are bolted to the under side of plate 89, with the slots in the radial castings under those in the plate 89, and the latter is bolted at the circumference to the wall of the column.

An elbow, 96, having its interior divided by a partition, 97, is bolted to the tubule 95, so that it forms a continuation of the passages in the radial castings. It extends through a stuffing-box in the side of the apparatus or column, and serves for the introduction of steam or other fluid into the space in the casting, and for the escape of the same therefrom.

The plate 89, with the radial and central castings, form when bolted together a horizontal perforated partition, in which the walls of the perforations can be heated at will by a current of steam through the chambers or passages with which the partition is provided. The perforations, as shown, are in the form of radial slots; but this is not essential, neither is the particular form of the castings forming part of the partitions. The steam-inlet pipe 98 is provided with a branch, 99, for each partition, which branch is connected with one of the passages in the elbow 96, and the steam-exit pipe 100 is provided with a similar branch, 101, which is connected with the other of said passages. The branches are or may be each provided with a suitable cock or valve, by which the flow of steam may be controlled. By opening the cocks in any pair of branch pipes steam from the inlet branch will flow through the radial and central castings, as indicated by the arrows in Fig. VI, and escape by the exit branch. Other fluid, whether for heating or cooling, could evidently be circulated in the same way. By having each branch communicate with a cold-water pipe as well as with a steam-pipe, the partitions could be heated or cooled at will by simply opening and closing the proper cocks or valves, and some of the partitions could be heated while others were kept cool. In effecting the decomposition of the sodium chloride (common salt) it is desirable to keep the temperature low, and therefore a circulation of cold water would be beneficial, although not essential. The walls of the slots, and also of the collars 90, are apt to become incrusted, and thus the proper passage of the fluids (carbonic-acid gas and the more or less decomposed brine) would be interfered with. By introducing steam into the passages or chambers in the partition these walls become rapidly heated and the crust peels or dissolves off, while the great body of the liquid remains cool. As soon as it is judged that the crust has disappeared the steam is turned off. The construction of these horizontal partitions produces a gas space at the top of each compartment, because before it can pass through the slots or perforations the carbonic acid must accumulate to a depth equal to that of the castings.

The collar 88 is cast hollow, leaving a passage or chamber inside, through which steam or water can be circulated.

There is a tubule, 102, on one side and a partition, 103, which causes the fluid entering at the top to leave at the bottom of the chamber in the collar, or vice versa.

A pipe, 104, having its interior divided by a partition, 105, is bolted to the tubule 102, and extends through a stuffing-box in the side of the apparatus. Inlet and exit branch pipes 99 and 101 are connected with it, the same as with the elbows 96.

The gas-outlet pipe 78, communicates with the upper part of the compartment in which the collar 88 is placed, and which, as before stated, has its top formed by the imperforate partition 87. This collar is made so deep that the gas may accumulate in such compartment under pressure sufficient to force it through the preliminary carbonating apparatus A' before it will depress the level of the liquid in that compartment below the bottom of the collar. As the apparatus A' opposes but little resistance, a collar of small depth will suffice. The descending brine, it will be understood, passes through the collar.

The carbonic-acid gas which has passed through the apparatus A' re-enters the precipitating apparatus by the pipe 79, which delivers the same into the compartment above the partition 87. It then rises through the upper compartments and escapes by the pipe 106. When the brine has reached the lower part of the precipitating apparatus E', it contains in solution a large percentage of chloride of ammonium (sal-ammoniac) from the decomposition of the chloride of sodium. A portion of this decomposed brine is withdrawn by the pipe 85 and returned to the upper part of the apparatus, as before described. The decomposed brine finally leaves the precipitating apparatus by the pipe 107, and is delivered into a filter of any ordinary or suitable description adapted to separate the bicarbonate of sodium from the solution of ammonium chloride. The bicarbonate of sodium is roasted in any suitable apparatus, preferably the roaster which forms the subject of a separate application filed May 10, 1886, and officially numbered 201,762.

The gases given off from the bicarbonate in the roaster, and consisting, mainly, of pure carbonic acid, pass, after cooling by common means, through the pipe 108 to the pump or compressor H', and are by it forced through one of the pipes 109 into the lowest compartment of the corresponding carbonator or precipitating apparatus, E'. It thus acts upon the brine when it is poorest in common salt (sodium chloride) and ammonia. The remainder of the supply of carbonic acid is taken from limekilns of any ordinary or suitable construction. This part of the supply, after cooling and purification by ordinary means—such as washing with cold water—is further purified in the washer or scrubber I', wherein it is washed with the ammonium-chloride liquor from the filter, and while the said liquor contains a considerable proportion of ammonia or of ammonium carbonate. The limekiln-gases enter by the pipe 110 and escape by the pipe 111. The ammoniacal liquor enters by the pipe 112 and escapes by the pipe 113. It runs into the tank K', and is thence pumped into the still, preferably that described in my application of even date herewith, officially numbered 201,165.

The washer or scrubber may be of any ordinary or suitable construction, but preferably is provided on the inside with a series of alternating and overlapping rings and disks, (like the column A shown in section in Fig. IV of my last-mentioned application,) so that the descending ammoniacal liquor, in dripping from ring to disk and disk to ring, falls in showers or sprays through the ascending gases. It washes out the sooty or carbonaceous particles which escape the means heretofore employed in the ammonia-soda manufacture for purifying the limekiln-gases.

After passing through the reservoir L', in which some of the liquid carried off by the gases is deposited, the said gases are carried by pipe 114 to the pump or compressor M', by which they are forced through one of the pipes 115 into the lower part of the corresponding carbonator or precipitating apparatus, E'.

The lower part of each carbonator is cooled by cold water distributed over its outer surface by a perforated pipe, 116, supported by brackets attached to the apparatus and supplied by the pipe 117.

The pipes 78, 79, 85, 109, and 115 each have the lower section, which is bolted to the apparatus, cast with hollow walls, to form in said walls a steam-chamber for heating the same to effect the removal of any crust which may form thereon. Other sections could be similarly cast for the same object. The pipes 109 and 115 are shown in Fig. IV as provided with rotary stirrers 118 for preventing a deposit taking place; but these may be omitted.

Each of the carbonators or precipitating apparatuses is provided with a vertical shaft, 119, armed with stirrers 120, in each compartment. These stirrers are fastened to a hub on the shaft, and this hub has a projecting disk, 121, which covers the opening in the collar below and prevents the liquid from passing straight down along side of the shaft. The disk, in connection with the stirrers, also gives to the liquid a horizontal centrifugal motion. By having the apparatus of large diameter this horizontal motion may be a long one, and the liquid thus be kept long in contact with the carbonic acid without increasing the height of the apparatus or column.

The stirrers should be set at such height above the partitions that they would not be embedded in the bicarbonate of sodium should the latter be allowed to settle.

The operation can be understood from the foregoing description; but the following restatement may be of assistance in giving a more perfect understanding.

The ammoniated brine enters the column A' by the pipe 75, meeting the rising carbonic acid, and has its ammonia converted more or less perfectly into ammonium carbonate. At the same time certain impurities (iron, for example) held in solution are precipitated. The brine then runs by one of the pipes 76 into one of the tanks B', and these precipitated impurities settle out. The brine, also, while settling loses more or less of the heat generated by the absorption of carbonic acid; and the heat may be further abstracted by running cold water over the column A' and the settling-tanks. The brine from the settling-tanks passes, by the pipes 80 81, receiver C', and one of the pipes 82, into one of the mixing-tanks D', wherein it is mixed with the cool and partly-decomposed brine from the coil G', and the two together enter the upper part of the corresponding precipitating apparatus, E', by the pipe 86. Preferably the amount of the decomposed brine is the larger of the two, (say four parts to one) so that the brine which enters the precipitating apparatus contains a considerable percentage of ammonium chloride in solution. In passing through the precipitating apparatus E' the brine is repeatedly acted upon by the carbonic-acid gas, which rises in bubbles and through the perforated portions or slots in castings 93, and in rising is the more perfectly mixed with it by the rotating stirrers 120, and which further remains in contact with the upper surface of the liquid in each compartment. A large part of the brine is also returned to the upper part of the apparatus, to be again acted upon by the current of carbonic acid. The result is that coarse crystals of bicarbonate of sodium are produced with certainty, rapidity, and small loss of ammonia. The stirrers prevent settling of the bicarbonate in suspension, and the slots and other passages are kept open by heating their walls by introducing steam into the chambers in said walls. In the lower part of the apparatus E', where the ammoniated brine meets the fresh currents of carbonic acid, the temperature is kept down by the supply of cold water there applied from the pipe 116. The decomposed brine, containing the bicarbonate of sodium in suspension, escapes by the pipe 107, and, after being deprived of the suspended particles by filtration, is used in the washer or scrubber I' to purify the limekiln-gases of tarry, sooty, or carbonaceous matters, which otherwise would be apt to contaminate the sodium bicarbonate. The purified limekiln-gases and the gases for roasting the bicarbonate of sodium are conducted by the pipes 115 and 109, respectively, into the precipitating apparatus. After rising through various compartments they are taken off by the pipe 78, carried through the preliminary carbonating-column A', and returned to the main carbonator by the pipe 79. They then rise through the remaining compartments and escape by the pipe 106. In the gas-space at the top of each compartment the gases are mixed, so that the liquid in all parts of the compartment above is subjected to gas equally rich in carbonic acid. The gases which escape from the carbonator are passed through any suitable apparatus—such as a wash-tower—for recovering the ammonia from the same, as customary.

In the carbonator or precipitating apparatus shown the compartments are quite numerous. The number of these could be reduced and still an efficient carbonation be secured. It will be understood that the number, dimensions, proportions, forms, and arrangements of the various parts, and also other details, could be modified without departing from the spirit of the invention, and that portions of the invention could be used without the others. It is not, for example, necessary to use a tank for mixing the fresh brine with the more or less decomposed brine from the lower part of the precipitating apparatus; but the mixing might be made in the precipitating apparatus itself.

Having now described the invention, what I claim, and desire to secure by Letters Patent, is—

1. The method of obtaining from limekilns carbonic acid free from carbonaceous or sooty matters by washing the limekiln-gases with a solution of soda, potash, or ammonia, or a carbonate thereof, whereby the sooty or carbonaceous matter is removed without the carbonic acid being absorbed, and collecting for use the washed gases, substantially as described.

2. In the ammonia-soda manufacture, the improvement consisting in washing the limekiln-gases with a solution of soda, potash, or ammonia, or a carbonate thereof, whereby the sooty or carbonaceous matters in said gases are removed without the carbonic acid being absorbed, and bringing the limekiln-gases so washed into contact with the brine, substantially as described.

3. In the ammonia-soda manufacture, the improvement consisting in washing the limekiln-gases with the decomposed brine or ammonium-chloride solution from which the sodium bicarbonate has been separated, substantially as described.

4. The combination, with the carbonator or precipitating apparatus and the compressor for forcing gas into the same, of the washer or scrubber supplied with liquor containing ammonia or ammonium carbonate in solution for removing the carbonaceous matter from the limekiln-gases on their way to said carbonator or precipitating apparatus, substantially as described.

5. In the ammonia-soda manufacture, the improvement consisting in washing the stream of limekiln-gases with a solution of soda, potash, or ammonia, or a carbonate thereof, and forcing the washed gases, directly on leaving the washer or scrubber, into and through the ammoniated brine, substantially as described.

6. In the ammonia-soda manufacture, the improvement consisting in subjecting the ammoniated brine to a preliminary carbonation, then cooling the brine thus carbonated, and afterward subjecting it again to the action of carbonic acid for precipitating bicarbonate of sodium, substantially as described.

7. In the ammonia-soda manufacture, the improvement consisting in subjecting the ammoniated brine to a preliminary carbonation, then permitting the brine to settle, and afterward subjecting the clear monocarbonated brine to the action of carbonic acid for precipitating bicarbonate of sodium, substantially as described.

8. In the ammonia-soda manufacture, the improvement consisting in withdrawing the carbonic acid after it has risen through the brine in the lower part of the carbonator or precipitating apparatus, bringing it in contact with the fresh ammoniated brine in the form of spray or showers, and then returning it into the carbonator and permitting it to rise through the brine in the upper part thereof, the carbonator being supplied with the brine which has been brought into contact with the carbonic acid as a spray or shower, substantially as described.

9. The combination, with the precipitating apparatus, of the preliminary carbonating apparatus or column, the pipes for conducting the carbonic acid from and returning it into the precipitating apparatus after passing through the preliminary carbonator, and a pipe or conveyer for conducting the monocarbonated brine into the carbonator or precipitating apparatus, substantially as described.

10. The combination, with the precipitating apparatus divided by horizontal perforated partitions, and one or more compressors for forcing carbonic acid into the bottom thereof, of the preliminary carbonating apparatus for bringing the brine in the form of a shower or spray into contact with the carbonic acid, and pipes for conducting the gas and liquid, said precipitating apparatus having a compartment therein in which the gas may collect under pressure, said pipes conducting the carbonic acid from said compartment and returning it into one above after passing through the preliminary carbonator, and delivering the brine from the latter into the precipitating apparatus, substantially as described.

11. In the ammonia-soda manufacture, the improvement consisting in introducing into the precipitating apparatus ammoniated brine and an ammonium-chloride solution, so that in the early stages of the decomposition of the sodium chloride the formation of bicarbonate of sodium in a liquid containing a considerable proportion of ammonium chloride is insured, substantially as described.

12. In the ammonia-soda manufacture, the improvement consisting in adding a stream of decomposed brine to the undecomposed or less decomposed brine, so as to increase the proportion of ammonium chloride in the brine during the early stages of decomposition without increasing the quantity of liquid to be distilled, substantially as described.

13. In the ammonia-soda manufacture, the improvement consisting in pumping back into the upper part of the precipitating apparatus decomposed brine from a lower part of the said apparatus, substantially as described.

14. In the ammonia-soda manufacture, the improvement consisting in pumping back decomposed brine, cooling it, and adding the stream of cooled liquor to the fresh brine, substantially as described.

15. In the ammonia-soda manufacture, the improvement consisting in subjecting the ammoniated brine to a preliminary carbonation, then mixing this monocarbonated brine with a stream of cold decomposed brine, and then treating again with carbonic acid to effect the decomposition of the sodium chloride in the liquid, substantially as described.

16. The combination, with the precipitating apparatus, of the return-pipe and pump for establishing a return-current from the lower to the higher part of the apparatus, substantially as described.

17. The combination of the preliminary carbonating apparatus, the precipitating apparatus, and the return-pipe for adding a stream of decomposed brine to the monocarbonated brine from the first-named apparatus, substantially as described.

18. The combination, with the precipitating apparatus, of the return-pipe and cooling-coil and pump, substantially as described.

19. The combination of the preliminary carbonating apparatus, the precipitating apparatus, the return-pipe and cooling-coil, and the pump, substantially as described.

20. In the ammonia-soda manufacture, the method of preventing clogging of openings in the precipitating apparatus by artificially heating the walls of said openings, so as to cause the crust to dissolve or to peel off without raising to an injurious extent the temperature of the body of the brine, substantially as described.

21. A carbonator or precipitating apparatus having the interior divided by perforated partitions and provided with passages or chambers for circulation of a fluid for heating or for cooling purposes, in combination with a liquid-inlet and gas-outlet at the upper part and a liquid-outlet and gas-inlet at the lower part, and a compressor for forcing carbonic-acid gas into the lower part of said carbonator or precipitating apparatus, which is kept full of liquid, substantially as described.

22. A carbonator or precipitating apparatus having the interior divided into compartments of greater diameter than height by partitions having each a series of perforations, and with depending parts through which the perforations are made, in combination with a compressor for forcing carbonic acid into the lower part of said carbonator or precipitating apparatus, substantially as described.

23. A carbonator or precipitating apparatus having the interior divided by perforated partitions, which comprise depending castings provided with perforations through which the carbonic acid may pass from one compartment to the next, and with passages or chambers for a heating or a cooling fluid, substantially as described.

24. In combination with a compressor and an inlet-pipe for the carbonic acid, an inlet-pipe for the brine, an outlet-pipe for the residual gases, and an outlet-pipe for the decomposed brine, a carbonator or precipitating apparatus divided into compartments of greater diameter than height by partitions having each a series of openings for subdividing the rising carbonic acid, said carbonator or precipitating apparatus being provided with rotary stirrers in the several compartments, substantially as described.

25. In combination with a compressor and an inlet-pipe for the carbonic acid, an inlet-pipe for the brine, an outlet-pipe for the residual gases, and an outlet-pipe for the decomposed brine, a carbonator or precipitating apparatus divided into compartments of greater diameter than height by partitions provided each with a series of perforations and with depending parts through which the perforations are formed, said carbonator or precipitating apparatus having mechanical stirrers in the several compartments thereof, substantially as described.

26. In the ammonia-soda manufacture, the improvement consisting in maintaining a body of brine of greater diameter than depth and also a similar body of carbonic acid above the brine in each of a series of vertical compartments, causing the ammoniated brine, and with it the products of the decomposition with carbonic acid, to descend by gravity through the several compartments and the carbonic acid to ascend through them, and mechanically stirring the brine in the said compartments, substantially as described.

27. The combination, with the precipitating apparatus divided by perforated partitions and provided with depending parts by which the perforations are inclosed, so that gas-spaces are formed at the top of the compartments, of the stirrers and disks in said compartments, substantially as described.

28. The combination, with a carbonator or precipitating apparatus divided by perforated partitions, of a cooler or sprinkler surrounding the lower part of the apparatus, for there applying fresh cold water to the outside of said apparatus, substantially as described.

29. The combination of the preliminary carbonator for bringing the ammoniated brine as a spray or shower in contact with the carbonic acid, the precipitating apparatus divided by perforated partitions, the return-pipe, pump, and cooling-coil for said precipitating apparatus, the compressors for the carbonic acid, and the washer or scrubber supplied with a liquid containing ammonia or ammonium carbonate for purifying the carbonic acid supplied from a limekiln, and the connecting-pipes for conveying gas and liquid, substantially as described.

In testimony whereof I affix my signature in presence of two witnesses.

HERMAN FRASCH.

Witnesses:
G. W. HAMMER,
CHAS. A. HARROW.